Oct. 3, 1972   V. E. HENLEY   3,695,974
TIRE BUILDING DRUM

Filed March 9, 1970

INVENTOR
VIRGIL E. HENLEY
BY
Harry F. Pepper Jr.
ATTORNEY

Oct. 3, 1972        V. E. HENLEY        3,695,974
              TIRE BUILDING DRUM
Filed March 9, 1970                2 Sheets-Sheet 2
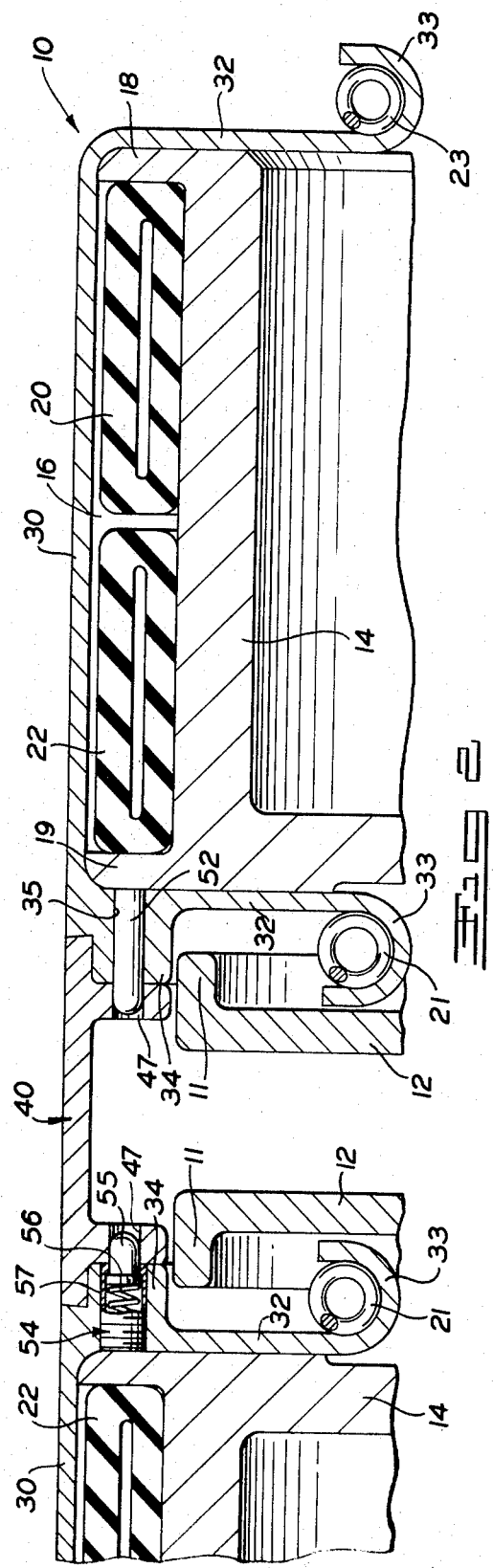
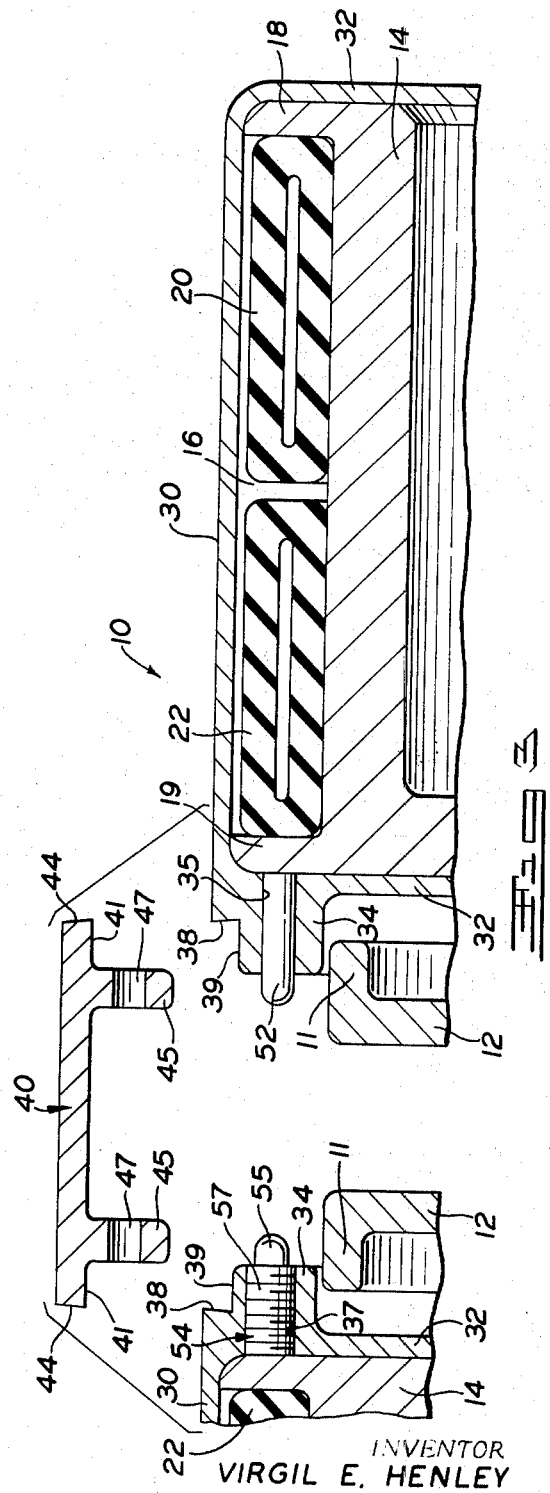
INVENTOR
VIRGIL E. HENLEY
BY
Harry F. Pepper, Jr.
ATTORNEY United States Patent Office 3,695,974
Patented Oct. 3, 1972

3,695,974
TIRE BUILDING DRUM
Virgil E. Henley, Akron, Ohio, assignor to The General Tire & Rubber Company
Filed Mar. 9, 1970, Ser. No. 17,662
Int. Cl. B29h 17/16
U.S. Cl. 156—415
2 Claims

ABSTRACT OF THE DISCLOSURE

A tire building drum, in which axially spaced cylindrical arrays of surface segments are axially adjustable to vary the over-all length or set of the drum, is provided with a plurality of annularly disposed spacing or bridging segments between the cylindrical arrays which are changed each time the drum set is changed. The surface segments of the respective arrays are situated so as to form axially aligned pairs of segments with the adjacent axial ends defining a gap which changes with a change in drum set. Each of these gaps is spanned or bridged by a spacer segment. The drum is adjusted to a predetermined length and the spacer segments are snapped onto the surface between the surface segments of the axially aligned pairs. To remove the spacer segments for replacement, the drum is increased in length and the spacer segments simply fall from the drum.

BACKGROUND OF THE INVENTION

The invention relates to expansible tire building drums and particularly to improvements to the outer surfaces of such drums.

Building tires by what is commonly called the "flat band" process frequently includes the use of a tire building drum which has a radially expansible, substantially cylindrical outer surface. The several components of the tire are placed on the outer surface on such a drum according to a prescribed building sequence to ultimately form a "green" tire or tire "blank" which is to be cured or shaped in a mold. During assembly of the tire and after the appropriate carcass components are in place, the drum is expanded to provide shoulders for positioning inextensible bead assemblies. The remaining steps of the building process are performed with the drum in its expanded state. After completing the building process, the drum is contracted and the tire blank is removed.

The axial length of a tire building drum is frequently called the "set" of the drum. Tires built on a drum of a given diameter sometimes require different sets so that desired variances in tire width or cross-section might be provided. It is therefore common to use tire building drums with adjustable sets to build tires of a given bead diameter.

To accommodate the aforementioned adjustability, drums are usually constructed in at least two annular sections which are axially movable toward and away from one another. It is evident that in drums of this type some provision must be made to bridge a variable gap between sections which occurs on the surface with changes in drum set.

One way to bridge this variable gap is to design the outer surface of each section with radially movable, arcuate, sheet metal segments which axially overlap at the location of the gap. The amount of overlap is determined by the desired maximum set of the drum. This type of drum is disclosed for example, in U.S. Pat. No. 3,160,546. Because of the arcuate extent of these sheet metal segments, it is also necessary to overlap the segments of each section circumferentially, so that large axial gaps do not form on the surface when the drum is expanded. These several areas of overlap cause an irregular or non-uniform building surface. Also, because of the overlapped areas, certain portions of the surface are weaker than other portions. Irregularities in the surface may be alleviated to some extent by providing a thick rubber sleeve over the drum. However, such sleeves have not solved the problem to the complete satisfaction of many tire makers. The other problem of an inconstant surface strength still remains, and forces applied during building, as for example, stitching forces, can adversely affect the drum surface as well as the tire assembly thereon.

Some of the undesirable effects caused by axial overlap of segments have been reduced by providing a bridging band of circumferentially overlapping, arcuate segments having an axial extent of such magnitude as to overlie major portions of the peripheries of the axially adjustable sections. The peripheries of these sections may be formed of segments which do not overlap circumferentially. A bridging band of this type is described in U.S. Pat. No. 2,979,110, assigned to the present assignee. Such a band reduces the total number of overlaps along the surface and is fairly effective in a range of shorter drum sets. However, in larger drum sets, surface strength as well as surface irregularity once again become serious problems.

A more recent U.S. Pat. No. 3,156,601, assigned to the present assignee, discloses an improved bridging band with narrow, axially extending segments which do not overlap circumferentially of the drum. The segments are substantially flat and abut edge to edge when the drum is contracted. The segments extend substantially the full length of the drum when the axially adjustable sections of the drum are at their innermost positions or at minimum set. Each segment is gradually tapered at its ends to minimize effects of the annular, overlapped edges which occur when the drum set is increased. However, problems in surface strength still exist even with this improved bridging band. When the drum is at minimum set the band of thin segments is supported by the drum sections. As the sections move away from each other during an increase of drum set, central portions of the bridging band segments must become self-supporting since the gap between sections widens. Because the bridging band segments are relatively thin, this central area of the drum can bend under certain forces applied thereto, such as stitching pressure. Also, while the tapered ends of the bridging segments has resulted in a surface with less structurally abrupt irregularities, the total building surface still is non-uniform since the over-all diameter gradually reduces from the center toward the ends.

From the foregoing, it is seen that while the outer surfaces of expansible, axially adjustable drums has gradually improved, need still exists for a surface which is stronger, smoother and more uniform throughout its complete range of sets.

SUMMARY OF THE INVENTION

It is an object of the present invention to provide an improved radially expansible, substantially cylindrical surface for an axially adjustable tire building drum.

It is another object to provide a tire building drum with an improved, radially expansible surface which is quickly and easily adapted for changes in drum set.

Still another object of the present invention is an improved axially adjustable tire building drum having a radially expansible building surface of axially extending segments arranged such that no two segments overlap, thereby minimizing building surface irregularities and avoiding possible slippage between segments during expansion.

These and other objects to become evident hereinafter are achieved through utilization of an independent series of spacer segments for each of the different annular gaps which occur on the surface of an adjustable tire building drum due to changes in drum set. The surface of the drum is characterized by coaxial circular rows of radially movable, axially elongated surface segments, where each surface segment in one row is axially aligned with and spaced from a surface segment of an adjacent row. The distance between a pair of aligned surface segments is determined by the drum set. When the drum set is changed the circular rows of surface segments move toward or away from one another, thereby decreasing or increasing the spacing between a pair of aligned surface segments. For a given drum set, the series of spacer segments for that set comprises a spacer segment dimensioned to fit each of the spaces between aligned surface segments. The spacer segments are releasably secured to and supported only by the surface segments. When the drum set is changed, the previous series of spacer segments are replaced with another series of different lengths.

DRAWINGS

FIG. 2 is an enlarged view of a portion of the drum shown in FIG. 1.

FIG. 3 is a view similar to FIG. 2 showing a spacer segment removed from the drum.

DETAILED DESCRIPTION

For the following description, frequent reference is made to the accompanying drawings in which like numerals represent similar structure throughout the several views.

Figure 1:
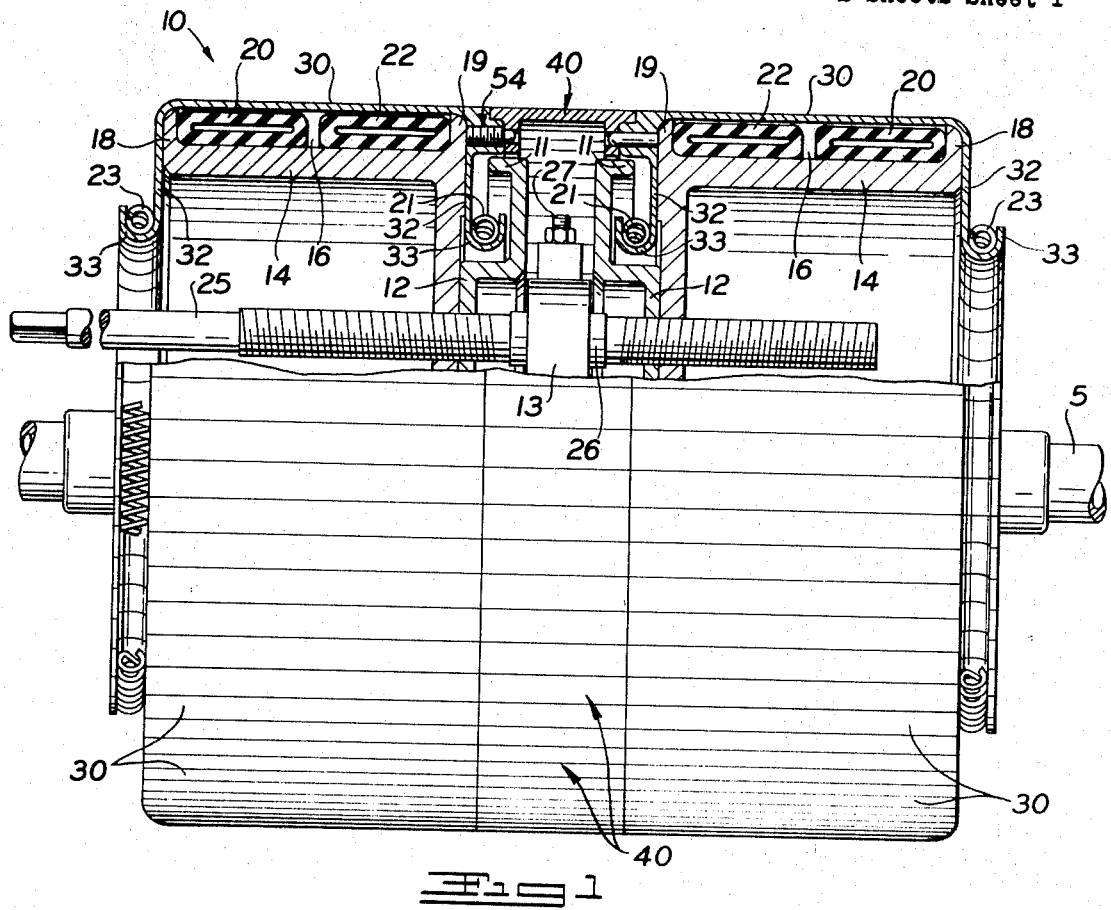
FIG. 1 is an elevation of a tire building drum with parts broken away and shown in section constructed according to a preferred embodiment of the invention.

In FIG. 1, a tire building drum 10 is shown secured to a rotatable horizontal shaft 5. The drum 10 is constructed in two sections, each of which comprises an annular, rigid body portion 14 secured to a hub member 12 which is slidably mounted on shaft 5. The periphery of each body portion 14 is provided with an annular compartment 16 defined by a pair of annular flanges 18 and 19 at opposite axial ends of body portion 14. Within each compartment 16 is a pair of inflatable elastomeric tubes 20 and 22. The inflatable tubes are shown in FIG. 1 in a deflated state and preferably are designed to fit within compartments 16, when deflated, so that no portions thereof extend radially beyond the outer extremities of flanges 18 and 19. The axial positions of hubs 12 and attached body portions 14 relative to shaft 5 may be adjusted by means of a right and left hand screw 25 threadably engaged with each slidable hub portion 12. The screw 25 is journaled in a central spider 13 fixed to shaft 5 and held against axial movement by a suitable setscrew 27 engaging an annular groove (not shown) in the bearing portion 26 of the screw. Thus, when shaft 5 rotates, screw 25, hubs 12 and body portions 14 will rotate therewith. Turning screw 25 moves body portions 14 toward or away from one another whichever is desired.

Each of the axially spaced body portions 14 support a radially expansible surface formed by a plurality of surface segments 30, extending axially across the pair of tubes 20 and 22 in each compartment 16. Each segment has a pair of radially inwardly extending legs 32 terminating in hooks 33. The hooks 33 collectively form an annular seat for a pair of inner and outer endless, helical garter springs 21 and 23. Springs 21 and 23 maintain an inward thrust on each plurality of segments 30 to hold them tightly against the outer faces of tubes 20 and 22, during expansion thereof. The contraction of the surfaces formed by each plurality of segments 30 is limited by flanges 18 and 19 of each body portion 14. The radial outward movement of segments 30 during expansion of tubes 20 and 22 is limited by a flange 11 on each hub member 12. The drum 10 is usually used in structural association with a pair of annular ply turn up mechanisms, which are not shown for the sake of simplicity. One mechanism is normally located at each end of the drum. The supporting structure for each mechanism preferably contains an annular flange positioned to limit radial outward movement of the hooked ends 33 at the respective ends of the drum, which are shown in FIG. 1 with such limiting means omitted. If ply turn up mechanisms are not used, a simple ring may be provided at each end to limit the radial extension of segment 30 or alternatively, the hooked ends 33 may be turned inwardly as shown in the aforementioned U.S. Pat. No. 3,156,601, assigned to the present assignee.

Air may be supplied to the bladders 20 and 22 of drum 10 through shaft 5, which is shown to be hollow, and thus routed to bladders 20 and 22 in each section by suitable passages within the drum. In the alternative, a selected portion of shaft 5 outside drum 10 may be hollow and air can pass through this portion to take off hoses (not shown) which lead into drum 10 alongside shaft 5. More complete descriptions of systems of this type are shown in the several United States patents referred to previously. Since several known means of air supply are suitable for this type of drum no specific means are shown herein.

The details of the drum 10 described to this point are conventional and are not particularly critical to the inventive concept to the described hereinafter. Certain obvious modifications may therefore be made in the basic drum structure without departing from the scope of the invention. For example, means other than screw 25 for adjusting the drum sections may be used. One, rather than two inflatable tubes may be used in each compartment 16 to expand the segments 30. Also, the drum 10 should not be considered limited to a construction employing only two sections, since more than two sections are common as shown in the aforementioned U.S. Pat. No. 3,160,546.

As shown in FIG. 1, each surface segment 30 in one section of the drum is substantially axially aligned with and spaced from a segment 30 of identical width in the other section. Thus, there are the same number of surface segments 30 in each of the movable sections. All the surface segments 30 are preferably of the same width so interchangeability is possible within a given section. In the drum 10 shown in FIG. 1, the surface segments 30 are also represented to be equal in length to allow interchangeability between sections. It is possible, however, to design a drum where each section carries a plurality of surface segments of a different length than the plurality carried by another section.

With the surface segments 30 axially aligned as stated, the surface of drum 10 can be viewed as comprising an annular arrangement of pairs of axially spaced, aligned surface segments with the distances between the segments of each pair forming an annular gap which is dependent upon the particular set of the drum. An annularly arranged plurality of spacer segments 40 are shown disposed across this annular gap with each spacer segment extending between the segments 30 of each of the axially aligned pairs. The axial lengths of spacer segments 40 are dependent upon the length of the spaces between the two sections of surface segments 30 during a particular building operation. Thus, a different series of spacer segments 40 is used when a new drum set adjustment is made. The spacer segments 40 are secured to and supported by the spaced axial ends of surface segments 30 in each section of the drum 10.

Figure 4:
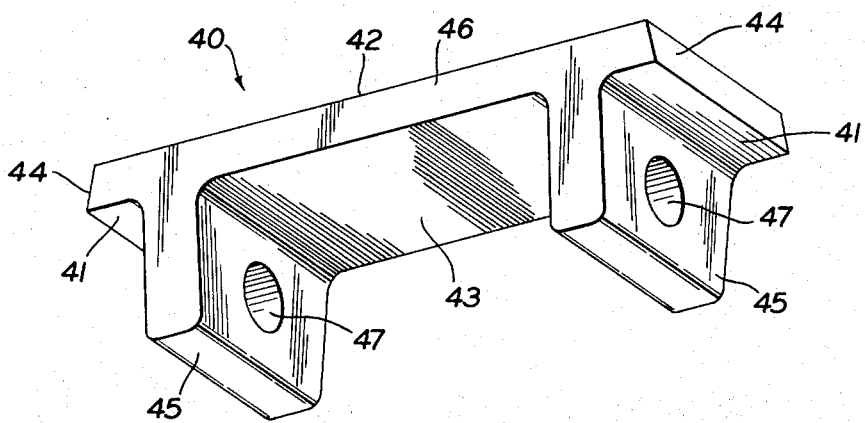
FIG. 4 is a perspectve view of a spacer segment which may be used in accordance with the present invention.

The spacer segments 40 can be shaped as shown in FIG. 4. A typical segment 40 includes a substantially flat upper or outer surface 42, slightly tapered end edges 44, and side edges 46 which are substantially perpendicular to upper surface 42. A pair of spaced lugs 45 extend substantially perpendicularly from the lower or inner surface 43 of the spacer segment 40. An opening 47 extends through each lug 45 as shown. The lugs 45 are preferably positioned longitudinally inwardly of ends 44 to provide a supportable flange-like surface 41 at each end of the spacer segment. The general design seen in FIG. 4 can apply to all the spacer segments 40 used throughout a range of drum sets. The basic difference between a spacer segment to be used for one drum set and one to be used in another is in the length of the segment.

The spacer segments 40 and surface segments 30 may be machined, cast or extruded into a desired shape and are preferably made of a suitable metal. It is conceivable however that the spacer segments 40 and surface segments 30 could be contructed of a material other than metal, such as plastic. Aluminum has been found to be a particularly suitable metal for spacer segments 40. For large inventories, spacer segments of extruded aluminum might be highly desirable.

For details on how spacer segments 40 can be secured to and supported by pairs of spaced surface segments 30, attention is directed to FIGS. 2 and 3. In FIG. 2 a typical segment 40 is shown secured to and supported by a typical pair of surface segments 30 on body portions 14 which are spaced in accordance with a selected drum set. In FIG. 3, a typical segment 40 is shown removed from the space between segments 30 in order to demonstrate the ease in which segments 40 may be interchanged.

As seen in FIGS. 2 and 3, each of the axial inner ends of the surface segments 30 are provided with an integral axially projecting portion 34. The right hand segment 30 has an axially directed opening 35 through portion 34 thereof. A retaining pin 52 is mounted in opening 35. The left hand segment 30 has a similar opening 37 through portion 34 thereof which is substantially coaxial with opening 35. A spring plunger member 54 is held in opening 37. The spring plunger 54 comprises a plunger head 55 biased by a spring 56 to protrude through the end of a hollow plunger housing 57 for said spring. The outer surface of housing 57 may be threaded as shown for mounting the spring plunger 54 in opening 37.

As seen particularly in FIG. 3, the ends of surface segments 30 which support the spacer segments 40 are specially designed for that purpose. The inner end of each surface segment 30 is provided with a horizontal surface 39 conforming to surfaces 41 of each spacer segment and a tapered surface 38 for abutment with tapered ends 44 of spacer segments 40. Openings 47 through lugs 45 are disposed so as to coaxial align with openings 35 and 37 when surfaces 41 and 44 of spacer segment 40 are in contact with surfaces 39 and 38, respectively, of a pair of surface segments. Thus, for a given drum set a typical spacer segment 40 will fit between a pair of surface segments 30 as shown in FIG. 2. The retaining pin 52 and spring plunger 54 hold each spacer segment 40 to the ends of surface segments 30. The engaging tapered surfaces 44 and 38 serve to lock the spacer segment in place and prevent rotation about the pin and spring plunger.

The specific means for holding spacer segments on the drum seen in FIGS. 2 and 3 have been found particularly suitable for quick, easy and efficient mounting and removal of spacer segments. Referring to FIG. 3, drum 10 is represented as being adjusted to a desired set. Spacer segment 40 in FIG. 3 represents a properly selected segment for the gap between surface segments 30 resulting from the drum set adjustment. In other words, the distance between ends 44 of spacer segment 40 substantially equals the distance between tapered surface 38 on left hand surface segment 30 and tapered surface 38 on right hand surface segment 30. To insert the spacer segment 40 between the surface segment 30, the drum adjustment is increased slightly so that the distance between segments 30 is for example about ⅛ inch from its final setting.

The segment 40 can then be angled slightly to engage retaining pin 52 through an opening 47 in lug 45 thereof. The other end of segment 40 then simply snaps in place with spring plunger 54 being first forced inwardly and then returning to slip into opening 47 in the other lug 45. The drum is adjusted to its final setting and the segment 40 is then firmly in place as represented in FIG. 2. Of course, the annular gap on the surface of drum 10 requires a plurality of segments 40 such as illustrated in FIG. 1, and therefore for each drum setting a plurality of spacer segments 40 are snapped on the drum as was previously described.

To remove the spacer segments 40 the drum set is increased to a point where the spring plungers 54 and retaining pins 52 are no longer engaging lugs 45 of each segment. All the segments will then simply drop from the drum.

From the foregoing it is seen that the number of different series or groups of spacer segments on hand for a particular building drum depend upon the range of drum sets typical for that drum. For example, if drum set is to be increased in ½ inch increments, then the series of segments for use with that drum should differ by ½ inch. Thus, when drum set is to be changed, the builder simply replaces the group of spacer segments on the drum with a different group having lengths which fit the gap resulting from the axial adjustment made to effect the new drum set desired. In this way, accommodations are made for changes in drum length with no significant changes in drum surface strength or contour.

It should be understood that the foregoing disclosure relates only to a preferred embodiment of the invention and that numerous modifications or alterations may be made without departing from the spirit and scope of the present invention as set forth in the appended claims.

What is claimed is:

1. In a tire bulding drum having a radially expansible, cylindrical outer surface comprising two axially spaced substantially cylindrical, surface portions of substantially equal diameter, each surface portion composed of an annularly disposed plurality of axially extending, radially movable surface segments, each surface segment in any portion being axially aligned with a surface segment of substantially identical width in the other portion, and a cylindrical bridging portion between said axially spaced, surface portions, the improvement wherein the adjacent axial ends of each pair of axially aligned surface segments are each provided with an axially extending support pin, one of which is biased so as to move relative to the axial end of the surface segment from which it extends and axially toward and away from the other pin, and said bridging portion comprises an annularly disposed plurality of radially movable, spacer segments, equal in number to said surface segments in one of said surface portions wherein each spacer segment is provided with an opening at each end to receive one of said support pins to thereby be supported by and extend between the adjacent axial ends of a pair of said axially aligned surface segments.

2. The improvement as defined in claim 1 further characterized in that said substantially cylindrical surface portions are axially adjustable providing a variable gap between said axial ends of each pair of axially aligned surface segments and wherein the length of each of said spacer segments is substantially equal to the length of said gap.

References Cited

UNITED STATES PATENTS 2,614,057   10/1952   Ericson et al. _____ 156—415 X

STEPHEN C. BENTLEY, Primary Examiner